US 6,713,137 B1

(12) United States Patent
Andersson et al.

(10) Patent No.: US 6,713,137 B1
(45) Date of Patent: Mar. 30, 2004

(54) MEDICAL CONTAINERS

(75) Inventors: Gunnar Andersson, Sollentuna (SE); Vittorio Sala, Ivera (IT)

(73) Assignee: Fresenius Kabi AB (SE)

( * ) Notice: Subject to any disclaimer, the term of this patent is extended or adjusted under 35 U.S.C. 154(b) by 0 days.

(21) Appl. No.: 09/448,922

(22) Filed: Nov. 23, 1999

Related U.S. Application Data
(60) Provisional application No. 60/110,625, filed on Dec. 2, 1998.

(30) Foreign Application Priority Data

Nov. 23, 1998 (SE) .............................................. 9804006

(51) Int. Cl.⁷ .............................................. B32B 27/32
(52) U.S. Cl. ..................... 428/35.7; 428/35.2; 428/213; 428/349; 428/516
(58) Field of Search .............................. 428/35.2, 35.7, 428/213, 349, 516

(56) References Cited

U.S. PATENT DOCUMENTS

| 5,071,686 A | 12/1991 | Genske et al. .............. 428/35.7 |
| 5,478,617 A | 12/1995 | Watanabe et al. ........... 428/35.2 |
| 5,783,269 A * | 7/1998 | Heilmann et al. .......... 428/35.2 |

FOREIGN PATENT DOCUMENTS

| CA | 769001 A | * | 1/1968 |
| EP | 0 345 774 | | 12/1989 |
| EP | 0 564 206 A2 | | 10/1993 |
| EP | 0 668 157 A1 | | 8/1995 |
| EP | 0 739 713 A2 | | 10/1996 |
| WO | WO 98/36905 | | 8/1998 |

* cited by examiner

*Primary Examiner*—Sandra M. Nolan
(74) *Attorney, Agent, or Firm*—Katten Muchin Zavis Rosenman; Gilberto M. Villacorta; Serge Sira

(57) ABSTRACT

The present invention relates to a flexible polyolefin multi-layered film for preparation of medical containers by self sealing, comprising at least a first outer layer and a second layer, each of the layers consisting essentially only of one or more polypropylene based polymers selected from the group consisting of polypropylene homopolymers, polypropylene copolymers having randomly distribute ethylene units and mixtures of said homopolymers and said copolymers, wherein said second layer has a melting point in the range between 120° C. and 150°, said first outer layer has a lower flexibility and a higher melting point than said second layer, and said second comprises a polypropylene polyethylene copolymer with a higher amount of ethylene units than said outer layer. The present invention also relates to medical containers made of or comprising the above film.

33 Claims, 1 Drawing Sheet

MEDICAL CONTAINERS

Figure 1:
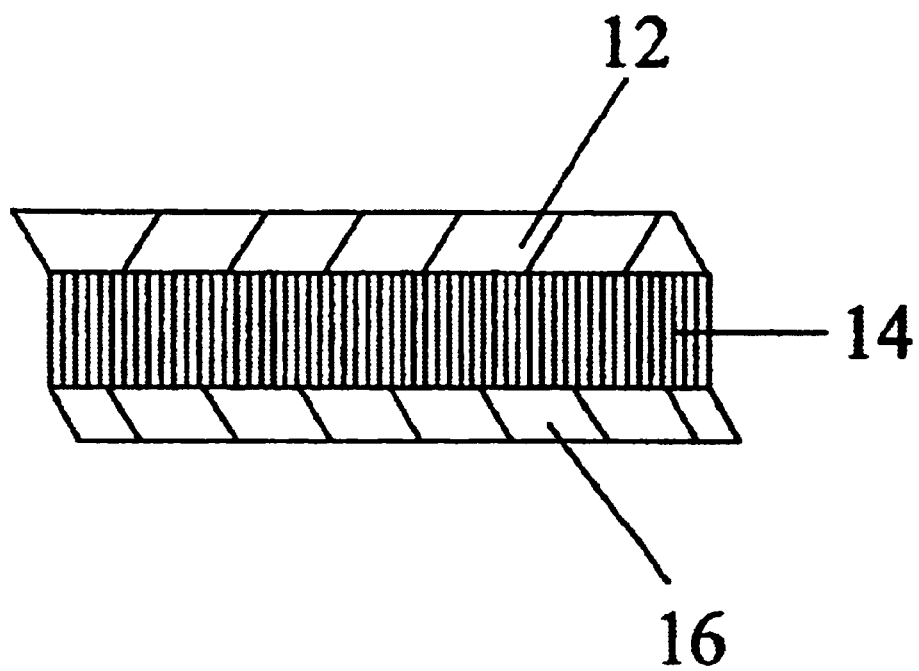

This application claims priority from Swedish Patent Application No. SE 9804006-6, filed Nov. 23, 1998, and U.S. Provisional Application No. 60/110,625, filed Dec. 2, 1998, both of which are incorporated herein by reference.

FIELD OF THE INVENTION

The present invention relates to a multilayered film suitable for the manufacturing of flexible containers for medical fluids. The film comprises polyolefins only and is assembled with coextrusion into several polyolefinic layers with complementary characteristics to build up a flexible film with high clarity. Further, the film is autoclavable and capable of forming weldings of controlled strength with conventional welding equipment.

BACKGROUND OF THE INVENTION

The efforts of developing containers of polymeric materials for parenterally administerable medical products to replace glass bottles are described in the International Patent Application PCT/SE97/00590. To find acceptance with authorities giving approvals to medical systems, such polymeric containers after being filled and finally sealed must be capable of being sterilized by high pressure steam (i.e. autoclavation at 121° C. for at least 15 minutes) with a maintained barrier capacity against the environment and safety from migration of potentially hazardous agents. Moreover, the container must maintain its shape, have a suitable aesthetic value and be easy to recycle after use. It is also of considerable importance that the material must have low production costs, since it is intended to be used for packaging medical fluids produced in large scale, including parenteral nutrient solutions.

As disclosed in the aforementioned International Patent Application, a polymer material suitable for a container for medical fluids for parenteral use must comply with several important requirements. The material must be possible to be permanently welded to a bag including other details of polymeric material, for example conventional saddle-formed port system and filling ports. It must also admit the formation of welded seams of different strength, in particular (weak) peclable seal seams possible to rupture manually, as well as permanently sealing welded seams, preferably by simple modifications of the welding conditions.

The material should be substantially impermeable for water vapor even during steam sterilization, but need not be completely airtight, since in many applications where an effective barrier against environmental oxygen is required to protect an oxygen-degradable product, it is advantageous to use a secondary outer airtight envelope enclosing the inner container filled with the product together with a sachet comprising an oxygen scavenger composition. In such a case, it is of advantage if the material of the container could permit an oxygen transfer from the degradable fluid to the oxygen scavenger for consumption of substantially all the dissolved residual oxygen in the product.

A polymeric material suitable for a medical container with many of mentioned characteristics would preferably comprise polyolefins, since they are cheap and chemically inert and free from potentially hazardous migrating agents compared to for examples halogenated polymers. With respect to this, various qualities of polyethylene and polypropylene are regarded as suitable materials. However, many polyethylenes are too soft and lack in heat resistance when heat sterilizing temperatures are reached which often is required in the pharmaceutical industry.

For many reasons, it would be desirable to use pure polypropylenes for the films when considering their capacity of withstanding autoclavation and maintain a barrier against water vapor and its favorable optical properties. However, pure polypropylenes are brittle and rigid, so in practice they often need to be blended with polymers which impart a softness and flexibility to provide a material with higher mechanical processability, such as polyethylene and certain thermoplastic elastomers.

In order to overcome the mentioned drawbacks of pure polyolefins, such as the insufficient flexibility and brittleness of polypropylenes and the softness and low melting point of polyethylenes, multilayered film materials consisting of several layers with complementary properties frequently have been developed for use in the packaging of medical fluids. For example, polypropylenes often have been combined with a supplementary elastomer to improve its flexibility and resilience. For multilayered materials, it has been preferred to have an inner, sealant layer comprising polypropylene to benefit from its compatibility to stored fluids and for facilitating the manufacturing of a container by means of different welding techniques. It has also been a desire to introduce a flexible layer with a high melting point which provides the material with an improved stability at the high temperatures locally reached during the welding. If such a material is comprised in a multilayered film, it is placed as an outer, release layer. In addition it is often requested that such a layer shall be printable in order to carry important information to the user and for this reason, it must not allow migration from the printing ink. Suitable materials for such an outer layer can be found among certain polyesters and copolymers thereof and in particular cycloaliphatic polyesters. To obtain a suitable flexibility to a multilayered film an elastomer may be introduced in the inner layers. Examples of this type of multilayered films are found in EP 0 228 819 and in EP 0 199 871. Such a material suitable for medical containers is Excel® from McGaw Inc. and as disclosed in the aforementioned PCT/SE97/00590, it has an acceptable compatibility with lipophilic fluids, such as the parenteral nutrient Intalipid® fat emulsion, although a certain amount of the elastomer SEBS (styrene-ethylene-butadiene-styrene) is compounded with the polypropylene in the inner, sealant layer facing the lipids during storage. Also in WO 95/26177, it is disclosed a similar material having a sealant layer comprising a polypropylene copolymer and an elastomer in a mixture. Furthermore, EP 0 229 475, EP 0 230 114 and EP 0 301 773 disclose multiple layer films comprising blends of polyolefinic polymers and elastomer modifiers.

Even if the mentioned multilayered films having elastomers and other polymers, besides polyolefins are suitable in many applications of medical containers, it is desirable to use only polyolefin materials in the packaging of medical fluids, especially in large scale packaging of parenteral nutrients including lipid emulsions. The most important reasons are the comparatively higher costs of many elastomers, the complicated production of multilayered materials including elastomers and that the remaining uncertainty of how such compounds may be affected during extended storage of particularly lipophilic medical fluids. Certain elastomer containing films have also demonstrated a tendency to delaminate, especially after autoclavation, due to low compatibility between the layers.

It would therefore be of great advantage to provide multilayered films only made from polyolefins of medical grade derived from a cheap source and yet retain the mentioned advantageous characteristics of the blended multilayered films discussed above.

EP 0 197 054 discloses a film having an outer high density polyethylene layer and an inner middle density polyethylene layer, suitable for autoclavable flexible containers. This film is reported to overcome difficulties in maintaining the shape of the container after autoclavation without compromising in other characteristics like impact strength and optical clarity. However, this type of film will not be suitable for welding seals of different strength as required for multi-chamber containers having easy rupturable seals as partitions between the chambers for readily mixing their contents before administration. Generally, layers made from polyethylene, due to their low softening temperature, hardly will be able withstand high pressure steam sterilization at 121° C. for required autoclavation periods over 15 minutes without being deformed. Moreover, polyethylene layers will reduce the impact strength of the material.

EP 0 216 639 describes a multi-layer film for packaging of physiologic solutions comprising at least two layers. One layer consists of polyester, polypropylene or a mixture of polypropylene and elastomer. The second layer consists of a mixture of polypropylene and elastomer. A possible third layer placed inside of the second layer consists of polypropylene or polyethylene. Films included in this patent either contain more than 90% by weight of elastomer or contain polyester or both. Nothing is revealed about the possibility to form seals of varying strength.

U.S. Pat. Nos. 4,536,549 and 4,540,416 disclose polyolefin films and containers made therefrom. The films comprise a characteristic blend of polypropylene random copolymer with 1–6% ethylene and a low linear low density polyethylene and provides articles which are sterilizable with high clarity and have low water vapor permeability. It is not further revealed herein if it is possible to construct sealing seams of different strength by welding these films together under different conditions.

EP 0 739 713 relates to coextruded, non-PVC multilayer films fee from softening agents which are reported to be impact resistant, heat sterilizable, flexible, transparent, substantially impermeable to water vapor, easy to recycle and may readily be formed into medical bags with one or more chambers by its sealing and welding capacities. These films principally consist of an outer layer and support layer having a softening temperature above 121° C. which surround at least one middle layer having a softening temperature below 70° C. and contributes to the overall flexibility of the film. Furthermore, the films comprise an innermost sealing layer. All layers essentially consist of a polyolefin homopolymer and/or a polyolefin copolymer. In an embodiment having particularly advantageous characteristics, an extruded seven layer film is suggested with a sealing layer comprising polypropylene random copolymer mixed with the thermoplastic elastomer styrene-ethylene-butyelene-styrene copolymer. Such a film will suffer from the aforementioned drawbacks of not being completely free from elastomers and will be unnecessarily complicated and expensive to manufacture to be perfectly suitable for large scale applications. In addition, there is no disclosure of its capacity of forming weldings of different strength and how heat sterilization influence such weldings.

U.S. Pat. No. 5,071,686 discloses a polypropylene based multilayer film for preparing flexible retortable pouches for medical solutions. In order to improve on the brittleness of the polypropylene, it is suggested to compound it with a modifier selected among different ethylene-based copolymers and elastomers. A number of such films are exemplified that comprise an outer and an inner, sealant layer of such polypropylene compounded with a modifier surrounding an inner layer based on a high density polyethylene mixed with the modifier. However, it is not disclosed if this material is suitable for preparing different types of both permanent and peelable welds with retained reduced strength after autoclavation at 121° C. for about 30 minutes.

EP 0 564 206, discloses a medical container with good heat resistance, transparency and softness. These properties are reported to be obtained by mixing an amorphous polypropylene with a crystalline polyolefin in a single-layer or a multilayer film material for preparing such a container. It is however stated that a thermoplastic elastomer, such as styrene based elastomer may be added to achieve good formability and mechanical properties and noting is revealed about the heat sealing capacity of the material. Further, a compromise between transparency and strength of the material has been made herein, since some of the clarity and transparency of amorphous polypropylene has been sacrificed for the introduction of the stronger crystalline polypropylene.

EP 0 369 788 describes films of seven different layers with improved moisture barrier properties, suitable for the manufacturing of medical bags filled with medical solutions which must be subjected to autoclavation before storage. These films have a drawback in their complicated structure and in their requirement of an adhesive layer between its outer layer and its inner layers. Furthermore, the films exemplified herein are not entirely based on polyolefins. As in the aforementioned EP 0 733 472, it is disclosed films for medical bags with improved clarity and flexibility which have an interior layer comprising homogenous ethylene/alphaolefin copolymer of a controlled density which require an adhesive layer and the provision of exterior layers comprising high density polyethylene.

WO 93/17863 describes a polymeric film suitable for the production of openable multi-chamber containers which when heat sealed readily is peeled by hand force without tearing apart and destroying the film, or risking delamination of its layers. The film has a sealant layer comprising a ternary blend of an ethylene propylene copolymer, a low density polyethylene and a butene polymer. It is not further revealed herein if the film is suitable for medical fluids or if heat seals of variety of strength is accomplished. U.S. Pat. No. 4,279,344 reports another Laminated film which solves the problem of obtaining heat seals openable by hand force which not are impaired by subsequent heat sterilization. The film comprises a ionomer resin and does not comply with the requirement of being composed of only polyolefins.

EP 0 699 521 describes multilayer films for producing heat sterilizable flexible containers comprising five layers of ethylene-alphaolefin each of a defined density.

WO 95/26177 discloses multilayer film materials, which are suitable for autoclavable multi-chamber containers filled with parenteral nutrients. The films are possible heat seal by means of welding so both permanent and week seal seams can be obtained in order to provide rupturable partitions between separately formed chambers so as to enable aseptic mixing of different stored components before their administration. However, these materials suffer from die mentioned drawbacks of comprising thermoplastic elastomers which both are costly and might have unknown effects when stored with lipophilic fluids.

From EP 0 345 774 it is known a material suitable for forming both easy-to-peel seals in a heat sterilizable medical bag for parenteral nutrients. This property will be achieved by selecting a resin for the film material comprising a mixture of materials with high mutual compatibility. A suitable resin is disclosed to comprise only polyolefins of selected different melt points, such as a mixture of polypropylene resin or a copolymer thereof with a higher melt point with a linear low density polyethylene. However, it seems that there is considerable risk that the softer polyethylene material may lead to deformations of the container from prescribed high pressure steam sterilization (autoclavation) at 121° C. for more than 15 minutes.

EP 668 157 describes a multilayer polyolefin film suitable for production of heat sealable containers for nutrients, comprising a base layer which preferably is made of 90–100% polypropylene polymer with a preferred melt point of 150 to 170° C., but can be made from propylene-ethylene copolymer with less than 10% (wt) of ethylene. The base layer is complemented with a covering or sealant layer which contributes to an improved capacity of the film to form welded heat seals and comprises a propylene-ethylene copolymer with preferably 1–7% (wt) of ethylene produced with specific metallocen catalysts, having a preferred lower melt point of 120 to 130° C. In this document, there are no disclosures of the mechanical properties of the film, i.e. its flexibility and it is properties after autoclavation are not discussed. Generally this film is too thin to be useful for containers filled with medical fluids for parenteral administration. Films having as low thickness as about 20 $\mu$m are very weak and can generate a substantial migration of undesired products from the film material into the stored fluids. This problem is aggravated when lipophilic fluids like lipid emulsions are stored in contact with ethylene containing polyolefins.

The German Patent Application DE 44 10 235 discloses a heat sealable multilayer which may be based substantially of polyolefins. The film preferably has an outer layer of polypropylene-polyethylene copolymer with 10 to 15% (wt) ethylene with a melt temperature between 160 to 165° C. and an inner, sealant layer based on a polypropylene having lower melt point of about 130° C. by the addition of a temperature reducing agent. Further, a middle layer is present preferably the same polypropylene-polyethylene copolymer as the outer layer. This film is fly aimed for packaging of conventional food products and is intended to be more easily peelable for the consumer. However, it is less suitable for the production of flexible containers for medical fluids since its transparency is compromised by the addition of talc in the outer layer and lacks both suitable flexibility and robustness to comply with the demands necessary for sterilizing and storing such products.

The Japanese Patent Application published as 9-85911 refers to a multilayer sealant film for packaging material consisting of polypropylene based polymers which comprise a layer of crystalline polypropylene resin. This film will have a drawback from its reduced clarity or transparency due to its addition of crystalline polypropylene.

WO 98/36905 A1 directs a multilayer film for sterilisable fluid containers. Included are flexible, transparent, all polyolefin films for the production of containers for infusion solutions. The film is autoclavable and capable of being sealed by welding, A multilayer film according to WO 98/36905 consists of different polymers and copolymers of propylene and ethylene. The film consists of an outer layer, an inner layer and n complex, intermediate layers. It is obvious from the examples of the WO 98/36905 that n Is equal or greater than three and that the inner layer is shown to be made of a linear low density polyethylene. Consequently, the structure is rather complicated, the film can not be easily manufactured and it comprises all the drawbacks connected to the use of a polyethylene, e.g. linear low density polyethylene as the most inner layer is not capable of allowing seals of different but controlled strength.

EP 0 346 774A1 mainly deals with a container with a plurality of compartments for foods or pharmaceutical products. The container is produced from a film consisting of a mixture of at least two polyolefin resins with a minimum difference in melting point of 8 degrees. A two layered structure is disclosed, wherein each of the layers is comprised of a blend of polypropylene and linear low density polyethylene or polypropylene, low density polyethylene and polyethylene. Coextruded films are disclosed comprising an inner layer made of low density polyethylene and polypropylene and an outer layer made of linear low density polyethylene. Because of the essential and dominant use of polyethylene material the resulting films and containers probably will suffer from poor transparency. Further the dominant use of material based on polyethylenes will give rise to problems with autoclavation. Finally, the welding time disclosed in the range of 1 to 10 seconds seems to be extraordinary long and is to be a considered an important drawback in terms of industrial applicability Similarly, in the U.S. Pat. No. 5,478,617 a multilayer film based on ethylene-α-olefin copolymers is described. Specifically, the film can withstand autoclavation, peelable seals can be formed and hence multi-chamber bags. The film is flexible and transparent, however, the film is based on polyethylene copolymers including all the drawbacks mentioned before in connection with polyethylene based films.

It is obvious that there is a high desire for a film material possible to be produced at low costs that could combine the safety of the polyolefins in medical applications and yet obtain the processability accomplished by the addition of thermoplastic elastomers. Additionally, it is desired to have suitable mechanical properties like flexibility, impact resistance, high resistance against beat deformation and high transparency. These advantages and together with the properties further stated below among the objects of invention are attained by a film material according to the appended claims and of the disclosures in the descriptions of the invention.

DESCRIPTION OF THE INVENTION

A first object of the present invention is to provide a film made only from polyolefin materials suitable for manufacturing flexible multi-chamber containers for storage of lipophilic parenteral fluids by welding both permanent and different peelable seal seams in a wide variety of applications with conventional equipment, including the formation of separate chambers which have partition seams rupturable by hand force of the user, in order to accomplish a safe and convenient mixing of separately stored agents within the container, just prior to the dispensing or administration of the resultant mixture.

A second object of the present invention is to provide a film which has low water vapor transmission, has suitable clarity and transparency and a high aesthetic value without spots and discoloration.

A third object of the present invention is the provision of a film which has a suitably high robustness and thickness while still having suitable mechanic properties for the production of containers for medical fluids, including a high flexibility, low brittleness and high impact resistance, also at low temperatures down to −30° C.

A fourth object of the present invention is to provide a film material which has little or no tendency for migration of agents from its polymeric matrix, even if subjected to long term contact with lipophilic fluids. Further, the film material should be printable with conventional printing without allowing migration of the ink into the material.

A fifth object of the present invention is to provide a film material which is capable of being processed into containers with a simple and economic welding technique by employing sealing bars without protective coverages, such as Teflon and silicone which frequently must be replaced when worn out.

A further important object of the present invention is to provide a film material with high heat resistance capable of maintain its shape when subjected to heat sterilization with pressurized steam (autoclavation) of at least 121° C. for at least 15 minutes, while maintaining the aforementioned characteristics.

A still further object of the invention is to be able to employ only cheap polyolefin raw material for producing the films which are manufactured with simple, conventional catalysts by coextrusion into flexible films, preferably of at least two layers with high compatibility to each other, so no adhesives or surplus adhesive layers will be necessary in order to provide a film without a tendency to delaminate.

The above mentioned objects are achieved by a flexible polyolefin multilayered film for preparation of medical containers by self sealing, comprising at least a first outer layer and a second layer, each of the layers consisting essentially only of one or more polypropylene based polymers selected from the group consisting of polypropylene homopolymers, polypropylene polyethylene copolymers having randomly distributed ethylene units and mixtures of said homopolymers and said copolymers, wherein said second layer has a melting point in the range between 120° C. and 150° C., said first outer layer has a lower flexibility and a higher melting point than said second layer, and said second layer comprises a polypropylene polyethylene copolymer with a higher amount of ethylene units than said outer layer.

According to the present invention the flexible film for preparation of medical containers by heat sealing is made only of polyolefins. The outer layer is an outer part with a higher melting point than its second layer or sealant part which is aimed to be engaged in a self-sealing process when forming containers. The sealant part thereby will constitute the inside of the film which when formed to a flexible container will contact the goods stored therein. For this reason, it is a prerequisite to be able to manufacture a container from the inventive film material by forming seams by heat sealing. Consequently, the material has an outer part, intended to face the outside environment, with a higher melting point than its sealant part, intended to face the interior of the container, so such sealant parts easily can be joined together under the influence of for example controlled heat and pressure from a conventional welding tool to form a sealing seam of adequate strength.

The film must have an outer part which contributes to the maintenance of the overall shape of the film by being essentially unaffected of the welding procedure, principally by having a higher melting point than the welding temperature. The sealant part of the film should, however, be capable of reaching its softening temperature at the welding temperature and sealing procedure, so a heat seal can be obtained when contacting sealant parts of the film under the influence of a conventional welding equipment Softening temperature is defined herein as the temperature when the polymeric material undergoes a phase transition from its solid form to a substantially softer form. When heating the material flier it will reach its melting point at which it will be completely liquefied It is to be understood that any welding processing of materials discussed herein will be performed at a temperature above the softening temperature but below the melting point. It would also be possible to obtain welds of different strengths, i.e. permanent and peelable welds, by welding at different temperatures with the films of the present invention.

It is an important aspect of file present invention that the films consists essentially only of polyolefins. By "essentially only" is meant that minor parts, such as about 0.01 to 1% (by weight) of conventional non-polymeric additives, as exemplified by antioxidants and stabilizers, can be included.

According to the present invention, the polyolefins are polypropylene based polymers including polypropylene homopolymers and polypropylene copolymers.

Preferably, the polypropylene based polymers are crystalline. Essentially, the polypropylene copolymers have randomly distributed moieties of a comonomer. It is preferred that the comonomer of such polypropylene copolymer is ethylene and that the polypropylene-polyethylene random copolymers are prepared from cheap granulated raw material sources made with conventional catalysts, such as Catalloy Spheripol from Montel. It is an important part of the present invention to be able to use cheap and conventional polyolefin materials which not need sophisticated production processes or the presence of exclusive catalysts which may require additional consideration with regard to that any residual trace amounts may affect the clinical quality of the stored pharmaceutical product.

The films according to the present invention typically have a higher amount of ethylene units in its second layer or sealant part compared to the outer layer or outer part, respectively, in order to accomplish a part with lower melting point in comparison to the outer part of the film. These characteristics contribute to obtain the welding properties of the film material into a flexible single- or multi-compartment container.

Theoretically, such films could contain a continuously increasing ethylene amount from its outer surface to its inner surface to obtain a gradually reduced melting point from outer surface to its inner surface, since a higher amount ethylene units in a polypropylene-polyethylene copolymer generally reduces the melting point.

In order to simply accomplish heat sealable films with a lower melting point in its sealant part, the films according to the present invention comprise a specific layer of one or several polypropylene polymers including at least one polypropylene-polyethylene copolymer with a defined amount of ethylene units to provide a defined melting point. Such a layer has a melting point between about 120 to 150° C. and preferably between 135 and 145° C. According to a specifically preferred example the melting point is about 139–141° C.

Generally, the films according to the present invention are multilayer films having at least two layers, a first outer layer with a melting point above the sealing temperature and a second layer with a comparatively lower melting point than said first layer.

The first, outer layer has the capacity of being heat resistant to provide the film with stability during the welding and further it gives the film a hardness and a desirable impact strength. Additionally, the first layer is printable and will not allow migration of the printing ink. The first layer preferably comprise one or more a polypropylene polymers selected among polypropylene homopolymers and polypropylene-polyethylene copolymers. Typically suitable amounts ethylene units in such polypropylene-polyethylene copolymers vary between 1 to 5% (weight). Preferably, the first layer has a melting point exceeding about 145° C. More preferably from about 145 to 160° C. and most preferably between about 145 and 150° C.

The second layer comprises at least one polypropylene-polyethylene copolymer with a higher amount of ethylene units than any polypropylene polyethylene copolymer of the first layer. Preferably, said polypropylene-polyethylene copolymers comprise between 5 to 50% (weight) ethylene units, more preferably between about 10 to 30% weight. Furthermore, the comparatively higher content of ethylene units polypropylene-polyethylene copolymer of the second layer contributes to provide the film with desired mechanical properties like flexibility, For this reason, the second layer is thicker than the first layer and preferably, the second layer has at least the double thickness of the first layer. According to one aspect of the invention, the second layer can constitute the sealant layer and be capable of self-sealing by means of welding. The second layer has a lower melting point than the first layer which preferably is below 140° C. and most preferably between about 130 to 140° C.

It is of importance that the film is sufficiently robust while being highly flexible and suitable for self-sealing by welding. For this reason, the film preferably has certain thickness that, on the other hand, must not compromise with the flexibility and the other mentioned necessary requirements. A suitable thickness is also of importance to compensate for any migration of undesired compounds from the film. It is therefore preferred that the film has a thickness of at least 100 µm, more preferably it has a thickness of at least 150 µm and most preferably about 150 to 250 µm. As previously discussed, it is preferred that the second layer is the thickest and contribute most to the overall flexibility of the film, whereas the first layer can be regarded to provide it with supplementary strengthening characteristics necessary for practical use of the film.

In addition to the first and second layer, one or more additional layers can be included which are comprised of polypropylene-polyethylene copolymers or of mixtures of the materials comprised in the first and the second layers. The thickness of such an additional layer is substantially less than the thickness of the second layer and preferably of the same dimension as the first layer. Preferably, the additional layer(s) are added to the inner part of film and will consequently face the second layer. In such a case, at least the innermost additional layer is provided with a self-sealing capacity and can provide sealing seams with conventional welding techniques, as is described above. The melting point of the said preferred additional layer(s) will be lower than the melting point of the first layer, but not necessarily lower than the melting point of the second layer.

According to a preferred embodiment of the present invention, the film contains a first and a second layer according to above and a third, additional sealant layer having a melting point lower than the melting point of the first layer and the is same or lower melting point, than said second layer. Furthermore, in such a film, the thickness of the second layer will exceed the sum of the thickness of the first and third layers. The overall dimensions of the film typically may vary so that the outer layer has a thickness of about 10 to 50 µm, the second layer has a thickness of about 100 to 200 µm and the sealant layer has a thickness of about 10 to 50 µm.

According to a first aspect of the abovementioned preferred embodiment the first layer is defined as above and the third layer comprises a polypropylene polyethylene copolymer with a higher amount of ethylene units than any polypropylene polyethylene copolymer present in the first layer. The second layer will in such case consist of a mixture of material of the first layer and the third layer. The melting point of the second layer, consequently will be lower than the melting point of the first layer, but higher than the third layer which will be engaged in the sealing process. Typically, the first layer will comprise a polypropylene polyethylene copolymer with 1 to 5% (weight) and preferably about 2% (weight) of ethylene units and the third layer will comprise a polypropylene polyethylene copolymer with 5 to 50% (weight), preferably between about 10 to 30% (weight) and more preferably about 15% (weight) of ethylene units, while the second layer will comprise a mixture of polymers comprised in the first and the third layers. Such a mixture contains from about 95 to 5% (weight) of the polymer comprised in the first layer and from about 5 to 95% (weight) of a polymer comprised in the third layer. Preferred mixtures contain about 90 to 75% (weight) of the polymer comprised in the third layer and about 10 to 25% (weight) of the polymer comprised in the first layer. A most preferred mixture 5 contain about 85% (weight) of a polymer contained in the third layer and about 15% (weight) of a polymer contained in the first layer.

A suitable film according to this first aspect is composed of:
(i) a first layer (or outer layer) consisting of a polypropylene polyethylene copolymer with 2% (weight) ethylene units having a thickness of 20 µm;
(ii) a third sealant layer consisting of polypropylene polyethylene copolymer with 15% (weight) ethylene units having a thickness of 30 µm; and
(iii) a second (or middle layer) consisting of a mixture of the polymers of the first and third layer which contains 85% (weight) of the polymer of third layer and 15% (weight) of the polymer of the first layer.

According to a second aspect of the preferred embodiment above, the first layer is the defined as above, the second layer comprises a polypropylene polyethylene copolymer with a higher amount of ethylene units than any polypropylene polyethylene copolymer present in the first layer and the third layer contain the same material as the second layer;

Preferably, the first layer will comprise a polypropylene polyethylene copolymer with 1 to 5% (weight) and more preferably about 2% (weight) of ethylene units. The second layer preferably will comprise a polypropylene polyethylene copolymer with 5 to 50% (weight) and more preferably about 15% (weight) of ethylene units.

According to the alternative when the second and third layers contain the same material a preferred film is composed of:
(i) a first layer (or outer layer) consisting of a polypropylene polyethylene copolymer with 2% (weight) ethylene units having a thickness of 20 µm;
(ii) a second (middle) layer having a thickness of 140 µm consisting of a mixture of 85% (weight) of a polypropylene polyethylene copolymer with 15% ethylene units (weight) and 15% of the material of the first layer; and
(iii) a third (sealant) layer having a thickness of 30 µm consisting of the same material as the second layer.

The characteristics of the individual layers of described multilayered films comprising polypropylene polymers contribute to surprisingly favorable overall mechanical properties and suitability for applications for the pharmaceutical industry. The first, outer layer contributes to stabilize the film during heat sealing and imparts a desirable hardness and impact strength to the material. The second layer gives the film a suitable flexibility. The optional additional layers provides further improvements in sealing capacity and further provides heat seal seams of different strength can be produced when varying welding conditions, such as welding temperature and pressure. The restriction to only polypropylene polymers, such as polypropylene homopolymers and polypropylene-polyethylene copolymers of varying ethylene content in the layers, leads to an excellent compatibility of the layers so no adhesives or adhesive layers are required and there is a minimized risk for delamination of the material. Altogether, the inventive film maintains the favorable clarity and transparency and retain the water vapor resistance of pure polypropylene in a surprisingly high manner also after being subjected to harsh heat sterilization condition by means of high pressure steam (i.e. autoclavation at about 121° C. for more than 15 minutes), It is a further advantage that the inventive films maintain their flexibility at low temperatures at about 2 to 5° C. at which containers made from the film frequently will be stored. The containers will thereby be less fragile during cold transportation and the risk for accidental leakages is reduced.

These properties, together with the high safety from migration of agents from its polymer matrix, renders the film excellent qualities for being shaped into containers for a wide range of medical fluids. Most importantly, the inventive films will also comply with requirement of the European Pharmacopoeia that less than 5% of the copolymers are extracted in a standardized test A number of polymer materials have been found suitable for the layers of the inventive films, For the sealant layer examples of suitable materials are the film Adflex 7104 XCP from Montell of random propylene-ethylene copolymer with about 15% ethylene units and the film Daplen KFC 2008 from PCD of random propylene-ethylene copolymer having about 8% ethylene units. For the first outer layer, the random propylene-ethylene copolymers Eltex 104 from Solvay (about 3–4% ethylene units and a melting point of 146° C.), Daplen KFC 2004 from PCD (about 3–4% ethylene units and a melting point of 148–152° C.), EPI X30F from Montell (about 2% ethylene units and a melting point of 152° C.) and RD 701H from Borealis (with about 2% ethylene units and a melting point of 148–150° C.) have been found suitable. As a middle layer material, the mentioned Adflex 7104 XCP, the random propylene-ethylene copolymer Softflex SD 200F from Borealis with about 15% ethylene units and melting point of 141° C. and the random propylene-ethylene copolymer Daplen RAHECO K 2033 from PCD with 13% ethylene units and a melting point of 140° C. are suitable material. As understood from the description above also mixtures or blends of these materials can be used for the preparation of films according to the present invention.

The manufacturing of the flexible material according to the present invention is performed by conventional coextrusion into sheet formed films of suitable dimensions. The sheets can thereafter be processed into containers for medical fluids having one or several compartments according to what has been described in more detail by the International Patent Application PCT/SE97/00590 by forming different seams with heat sealing. The manufacturing and filling procedures can be performed with a number of conventional methods know to persons skilled in medical packaging technology and will not be further described herein.

DETAILED DESCRIPTION OF THE INVENTION

FIG. 1 shows a principal drawing of a cross-section of a film according to a three-layered embodiment of the present invention.

EXAMPLE 1

The embodiment of the inventive film showed in FIG. 1 consists of three layers 12, 14 and 16. The first layer 12 consists of polypropylene ethylene copolymer having 98% propylene and 2% ethylene and has a thickness of 20μm with a melt point of 139° C. This polymer is of the quality EP1C30F from Montell. The third, sealant layer 16 consists of polypropylene ethylene copolymer with 15% ethylene units and has a thickness of 30 μm and a softening temperature of 85° C. This polymer is of the quality ADPLEX 7104 XCP from Montel Europe NV. The second, interior layer consists of a mixture of 85% ADFLEX 7104 XCP and 15% EP1C30F and has a thickness of 140 μm having a softening temperature of approximately about 95 to 100° C.

To prepare such a granulated raw material of EP1C30F and ADFLEX 7104 XCP were batched individually and in the mentioned 85–15 mixture and heated to their respective melting temperature. The liquefied polymer materials were fed through five extruders of conventional features having individually adapted nozzles. Two extruders were extruding the first outer layer and third, sealant layers of film to mentioned thickness. Three identical extruders extruded the merged second inner layer from the 85–15 mixture. The extrusion temperatures were heated to 250° C. The production rates of the film can be varied between about 1 to 19 meters per minute dependent on desired product quality and production economy.

EXAMPLE 2

A film manufactured in accordance with Example 1 was welded into pouch formed flexible containers by joining sealant layers together and subjecting the joint part with a heated welding tool of a conventional design for this purpose. The welding temperature of die tool was having a temperature of 130° C. The tool had a contact time of about 1 second in an arrangement allowing not more than 1.2 second contact time. After cooling the seam to room temperature the so formed pouches were manually inspected for durability. It is appreciated that the pouches have sufficiently durable seams to be suitable for storing and shipping liquid pharmaceuticals.

EXAMPLE 3

Films made in accordance with Example 1 were compared for delamination with samples of the film material Excel consisting of an outer copolyester layer tied to a layer of ethylene-propylene copolymer compounded with thermoplastic elastomer SEBS. The films were wiped vigorously with pads soaked in ethanol for several minutes. After the end of this process, in some samples of the Excel film the layers showed a clear tendency to separate from each other. In contrast, films according to the present invention made in Example 1 was entirely unaffected in terms of delamination.

EXAMPLE 4

The films made in accordance with Example 1 were tested for their flexibility and clarity. It was found by tentative flexibility tests that invention film material was only marginally less flexible than Excel. The visual clarity of pouches made of the presently invented films was compared with die guidelines of the European Pharmacopoeia for this type of material and they were found to have suitable clarity and suitably low opacity.

EXAMPLE 5

A two-layered structure was produced in accordance with the present invention.

| Layer | Composition of layers [%] (w/w) | Thickness [μm] | $T_m$ [° C.] | Ethylene content of layers [%] (w/w) |
|---|---|---|---|---|
| 1st | 100% EP1 X30F | 20 | 152 | 2 |
| 2nd | 75% Adflex 7104 XCP 25% EP1 X30F | 160 | 140–150 | 12 |

The materials used are:

EP1 X30F: Random propylene/ethylene copolymer with 2% by weight of ethylene produced by Montell. $T_m$=152° C.

Adflex 7104 XCP: Random propylene/ethylene copolymer with 15% by weight of ethylene produced by Montell. $T_m$=139–141° C.

The mixture of the $2^{nd}$ layer is produced by compounding the right proportions of the two materials and extruding pellets from the blend. These pellets are fed into the extruder for co-extrusion. The film is produced by coextrusion and can be considered as a two layer film. This film can be welded at 1.8 bar, 161° C. and 2 s alternatively at 4 bar, 133° C. and 2 s and is printable.

EXAMPLE 6

A film was produced according to example 5 with the exception that the film is produced by co-extrusion using 3 to 5 extruders. One extruder extrude the $1^{st}$ outer layer and 2 to 4 identical extruders extrude the 2layer. Hence the film can either be considered as a three or five layer a multi-layer film with the $2^{nd}$ and $3^{rd}$ layer comprising the same material according to present invention.

Like the film of example 5 also these films film can be welded at 1.8 bar, 161° C. and 2 s alternatively at 4 bar, 133° C. and 2 s and are printable.

What is claimed is:

1. A flexible polyolefin multilayered film for the preparation of medical containers by self sealing, the film having a thickness of at least 150 μm and consisting of an outer layer, a middle layer, and a sealant layer each of the layers consisting essentially only of one or more polypropylene based polymers selected from the group consisting of polypropylene homopolymers, polypropylene-polyethylene copolymers having randomly distributed ethylene units, and mixtures of said homopolymers and said copolymers, wherein said middle layer comprises a polypropylene-polyethylene copolymer with a higher amount of ethylene units than said outer layer, and wherein said sealant layer has a lower melting point than said outer layer.

2. The film according to claim 1, wherein said middle layer has a melting point in the range between 135 and 145° C.

3. The film according to claim 1, wherein said film is capable of being heat sealed into seams by contacting sealant parts under the influence of heat.

4. The film according to claim 3, wherein the heat sealing is performed by means of welding.

5. The film according to claim 2, wherein said outer layer has a melting point above 145° C.

6. The film according to claim 1, wherein said outer layer comprises polypropylene-polyethylene copolymers having an ethylene amount of 1 to 5% by weight (w/w).

7. The film according to claim 1, wherein the middle layer has more than double the thickness of the outer layer.

8. The film according to claim 1, wherein said middle layer comprises polypropylene-polyethylene copolymer with between 5 to 50% by weight (w/w) of ethylene structural units.

9. The film according to claim 1, wherein said sealant layer has a thickness less than the thickness of the middle layer.

10. The film according to claim 9, wherein said sealant layer comprises polypropylene-polyethylene copolymers having a higher amount of ethylene units than any polypropylene-polyethylene copolymer present in said outer layer.

11. The film according to claim 1, wherein said sealant layer includes mixtures of materials comprised in said outer and middle layers.

12. The film according to claim 1, wherein the thickness of said middle layer exceeds the sum of the thicknesses of said outer and sealant layers.

13. The film according to claim 12, wherein the outer layer has a thickness of about 10 to 50 μm, the middle layer has a thickness of about 100 to 200 μm, and the sealant layer a thickness of about 10 to 50 μm.

14. The film according to claim 12, wherein the middle layer contains a mixture of the material of the outer and sealant layers.

15. The film according to claim 14, wherein said sealant layer comprises a polypropylene-polyethylene copolymer with 5 to 50 wt. % of ethylene units.

16. The film according to claim 15, the film comprises:
 a) an outer layer comprising a polypropylene homopolymer or polypropylene-polyethylene copolymer with 1 to 5 wt. % of ethylene units;
 b) a sealant layer comprising a polypropylene-polyethylene copolymer with 5 to 50 wt. % of ethylene units; and
 c) a middle layer containing a mixture of between about 95 to 5 wt. % of the material of the outer layer and between about 5 to 95 wt. % of the material of the sealant layer.

17. The film according to claim 16, wherein the middle layer comprises a mixture of between about 75 to 90 wt. % of the material of the sealant layer and between about 10 to 25 wt. % of the material of the outer layer.

18. The film according to claim 17, wherein the middle layer comprises about 85 wt. % of the material of the sealant layer and about 15% of the material of the outer layer.

19. The film according to claim 18, wherein the outer layer comprises a polypropylene-polyethylene copolymer with about 2 wt. % ethylene units and the sealant layer contains a polypropylene-polyethylene copolymer with about 15 wt. % ethylene units.

20. The film according to claim 12, wherein the middle and sealant layers comprises the same material.

21. The film according to claim 20, wherein the middle and the sealant layers comprise a polyethylene copolymer with about 10 to 30 wt. % ethylene units.

22. The film according to claim 21, the outer layer comprises a polypropylene-polyethylene copolymer with 1 to 5 wt. % of ethylene units.

23. The film according to claim 22, wherein the middle and the sealant layers comprise a mixture of polypropylene-polyethylene copolymer with 1 to 5 wt. % of ethylene units and a polypropylene-polyethylene copolymer with about 10 to 30 wt. % ethylene units.

24. The film according to claim 23, wherein the middle and the sealant layers comprise a mixture of polypropylene-polyethylene copolymer with about 2 wt. % of ethylene units and a polypropylene-polyethylene copolymer with about 15 wt. % ethylene units.

25. The film according to claim 24, wherein the middle and the sealant layers consist of a mixture of about 75 to 90 wt. % of a polypropylene-polyethylene copolymer with about 15 wt. % of ethylene units and about 10 to 25 wt. % of a polypropylene-polyethylene copolymer with about 2 wt. % of ethylene units.

26. The film according to claim 13, wherein the outer layer has a thickness of about 20 μm, the middle layer has a thickness of about 140 μm, and the sealant layer has a thickness of about 30 μm.

27. A container having one or several compartments for storage of parenterally administrable fluids manufactured by heat sealing a film according to claim 1.

28. A container having one or several compartments for storage of parenterally administrable fluids and having peelable seal seams manufactured by heat sealing a film according to claim 1.

29. A container according to claim 27 enclosed in a sealed envelope made of a flexible substantially airtight material.

30. The film according to claim 2, wherein said outer layer has a melting point in the range between 145 and 160° C.

31. The film according to claim 2, wherein said outer layer has a melting point in the range between 150 and 160° C.

32. The film according to claim 1, wherein said middle layer has a melting point in the range between 120 and 150° C.

33. The film according to claim 1, wherein said outer layer has a lower flexibility and a higher melting point than said middle layer.

\* \* \* \* \*